(12) United States Patent
Schreiner et al.

(10) Patent No.: US 7,035,651 B2
(45) Date of Patent: Apr. 25, 2006

(54) PROCESS AND DEVICES FOR DETERMINING THE RADIO RECEPTION DIRECTION IN A MOBILE COMMUNICATIONS NETWORK

(75) Inventors: Matthias Schreiner, Malmsheim (DE); Michael Tangemann, Leonberg (DE)

(73) Assignee: Alcatel, Paris (FR)

( * ) Notice: Subject to any disclaimer, the term of this patent is extended or adjusted under 35 U.S.C. 154(b) by 401 days.

(21) Appl. No.: 10/365,409

(22) Filed: Feb. 13, 2003

(65) Prior Publication Data

US 2003/0162568 A1 Aug. 28, 2003

(30) Foreign Application Priority Data

Feb. 28, 2002 (EP) .................................. 02360074

(51) Int. Cl.
*H04Q 7/20* (2006.01)
*G01S 13/00* (2006.01)

(52) U.S. Cl. .............................. 455/456.5; 455/562.1; 342/153; 342/463

(58) Field of Classification Search ............. 455/456.1, 455/456.5, 561, 562.1, 67.11, 517; 342/147, 342/153, 154, 350, 367, 450, 457, 458, 463
See application file for complete search history.

(56) References Cited

U.S. PATENT DOCUMENTS 6,300,905 B1* 10/2001 Chen et al. ................... 342/457
6,421,007 B1* 7/2002 Owen et al. ................. 342/417
6,459,903 B1* 10/2002 Lee ........................... 455/456.1
6,639,554 B1* 10/2003 Kim et al. .................... 342/457
2003/0117320 A1* 6/2003 Kim et al. .................... 342/457
2003/0162568 A1* 8/2003 Schreiner et al. ........... 455/562

FOREIGN PATENT DOCUMENTS

| EP | 1 094 335 | 4/2001 |
| EP | 1 348 976 | * 10/2003 |
| GB | 2 173 643 | * 10/1986 |
| WO | WO 99/33302 | 7/1999 |

* cited by examiner

*Primary Examiner*—Rafael Perez-Gutierrez
(74) *Attorney, Agent, or Firm*—Sughrue Mion, PLLC (57) ABSTRACT

A process is proposed for determining the radio reception direction on the downlink at a radio base station location, comprising a plurality of radio coverage areas, in a mobile communications network, in which in each area on the downlink radio signals are radiated by means of a transmitting antenna for reception by at least one mobile communications terminal. For the determination of the radio reception direction, at least the reception levels of the radio signals radiated by a first and a second of the transmitting antennae are measured by the relevant mobile communications terminal. From the two measured reception levels, a ratio value is formed which is independent of the prevailing radio propagation conditions, and this ratio value is used to effect an estimation of azimuthal angles for the radio reception direction to be determined. The invention can thus be implemented in any individual radio base station location, it being unnecessary for there to be contact with a plurality of radio base stations. The calculation of a ratio value serves to eliminate influences which can arise from changing radio propagation conditions. In this way a reliable estimation of the azimuthal angles and determination of the radio reception direction is possible. This is independent of the prevailing radio propagation conditions.

10 Claims, 5 Drawing Sheets

PROCESS AND DEVICES FOR DETERMINING THE RADIO RECEPTION DIRECTION IN A MOBILE COMMUNICATIONS NETWORK

BACKGROUND OF THE INVENTION

The invention is based on a priority application (EP 02360074.5) which is hereby incorporated by reference.

The invention relates to a process for determining the radio reception direction on the downlink in a radio base station location in a mobile communications network according to the preamble of claim 1. The invention further relates to a mobile communications network with devices, in particular with a computer, a radio base station and a mobile communications terminal, for the implementation of the process according to the preambles of the subsidiary claims.

In mobile communications networks, in particular in cellular mobile communications networks, such as for example GSM (Global System for Mobile Communications) or UMTS (Universal Mobile Telecommunications System), it is important to know the instantaneous location of the mobile subscribers. So-called "location based services", i.e., mobile services dependent on the instantaneous location of the mobile subscribers, are of increasing interest. To be able to perform these and similar services, it is not only necessary to know the radio cell or radio field section in which the radio subscriber is located, but also to perform a more accurate position determination down to a few meters. Various methods are known for achieving this. Thus for example the so-called triangulation method is known, in which the distances between the mobile communications terminal and adjacent fixed ratio stations are calculated by measuring radio signal propagation times, the instantaneous location being determined on the basis of the intersection points of corresponding distance radii. For this purpose however there must be contact with at least two remote radio base stations. In addition, the radio transmitters of the radio base stations must be synchronised with one another, or at least the time differences between the transmitted signals, in particular between the symbols, must be known.

It is also known to firstly determine the radio reception direction by analyzing radio signal components present at group antennae, so-called smart antennae.

Then, in addition, the distance to the radio base station is also calculated (by measuring the signal propagation time) so that finally the location can be more accurately determined. However, the known processes involve a not inconsiderable computational outlay and have specific prerequisites, such as for example contact with a plurality of radio base stations or the presence of group antennae.

SUMMARY OF THE INVENTION

The object of the invention is to propose a process for determining the radio reception direction which can be implemented as simply as possible and yet supplies accurate information about the actual radio reception direction. Corresponding devices therefor are likewise to be proposed.

This objective is fulfilled by a process comprising the features according to claim 1 and by a mobile communications network, a computer, a radio base station and a mobile communications terminal comprising the features according to one of the subsidiary claims.

Accordingly, it is proposed that at least the reception levels of the radio signals radiated by a first and a second of the transmitting antennae are measured by the relevant mobile communications terminal, a ratio value being formed from the two measured reception levels. This ratio value is substantially independent of the prevailing radio propagation conditions, in particular the path losses on the radio links. This ratio value is then used to effect an estimation of azimuthal angles for the radio reception direction to be determined.

Also proposed is a mobile communications network suitable for the implementation of the process, comprising a computer which is connected to the radio base station location and which forms the ratio value of the two measured reception levels and thus in turn estimates the azimuthal angles.

The invention can thus already be fully implemented in any individual radio base station location. Contact with a plurality of radio base stations is not required. Moreover, use is made of measured values, i.e., the reception levels of the radio signals, which in many cases must anyhow be calculated for other purposes, such as for example handover measurements, and thus are already available in the mobile communications network. These measured values are transmitted from the mobile communications terminals to the fixed radio location, for example in the course of a so-called measurement report. The calculation of a radio value in accordance with the invention serves to eliminate the variables which impair the reception level values, in particular the variables characteristic of the radio propagation conditions, such as for example radio field attenuation or path loss. These variables are highly dependent upon the prevailing situation, such as for example visual radio connection, radio screening, fading, reflections or waveguide effects. The invention is based on the insight that the two reception levels whose ratio value is to be formed are impaired in like manner if the two transmitting antennae are mounted at the same location, preferably on the same antenna mast. In this case, by the formation of the ratio value (quotient formation) a relative value is obtained which is largely independent of the radio propagation conditions and thus facilitates a dependable estimation of the azimuthal angles and determination of the radio reception direction. Furthermore the quotient formation can be performed simply and rapidly. Thus overall a process is proposed which is very easy to implement but at the same time is very reliable.

Particularly advantageous developments of the invention are described in the sub-claims.

Thus it is particularly advantageous for the azimuthal angles to be estimated by comparing the formed ratio value with predetermined reference values indicating the expected ratio value for different azimuthal angles. The reference values are transmission power values which in the main radiation direction correspond to the EIRP-value (EIRP: effective isotopic radiated power) and in the other directions correspond to the transmission power values attenuated on the basis of the antenna diagram. The reference values, which thus indicate the angle-dependent distribution of the radiation power at the transmitting antennae, are likewise compared with one another to form a ratio value and are preferably stored in look-up tables. It is thus possible to effect a rapid and effective look-up table procedure which further reduces the computational outlay. By comparing ratio values at the receiving end (measured values) with ratio values at the transmitting end (reference values) it is possible for the azimuthal angles to be estimated without knowledge of the radio field attenuation.

It is also particularly advantageous for the transmitting antennae to consist of sector antennae or group antennae and for the radio coverage areas to be radio sectors which are each supplied by one of the sector antennae or group antennae. In this connection it is very advantageous for the two transmitting antennae, whose radio signals are to be measured in respect of the reception values, to supply two mutually adjacent radio coverage areas, and for the mobile communications terminal to be located at least in one of these two radio coverage areas. In this way a ratio value is formed between the most strongly prevailing reception levels, which further improves the reliability of the calculation method.

Independently thereof, or also in association therewith, another particular advantage is achieved if the reception levels of the radio signals radiated by the other transmitting antennae are also measured by the mobile communications terminal, a ratio value in each case being formed from two measured reception levels. Then the estimation of further azimuthal angles is effected by means of these further ratio values, and finally the radio reception direction is more accurately determined by means of all the estimated azimuthal angles. Thus an iterative process is proposed in which the reception levels are compared in pairs to form ratio values, the large number of resultant ratio values facilitating an even more accurate estimation of the azimuthal angles and thus also an even more reliable determination of the radio reception direction.

It is also particularly advantageous for one of the transmitting antennae to consist of an omnidirectional antenna by which the whole area of the radio base station location is supplied, and for the other transmitting antennae to consist of sector-or group antennae by which sector-shaped radio coverage areas are supplied.

The reception levels emanating both from radio signals of the omnidirectional antennae and from radio signals of the sector- or group antennae are measured by the mobile communications terminal. Thus in this case it is also possible to determine the radio reception direction within the particular radio coverage area by which the mobile communications terminal is directly supplied, referring on the one hand to the reception level relating to the omnidirectional antenna (e.g. reception level on the broadcast signaling channel) and on the other hand to the reception level of the coverage area (e.g. reception level on the communications channel within the sector).

BRIEF DESCRIPTION OF THE DRAWINGS

The invention itself and the advantages resulting therefrom will now be described in the form of an exemplary embodiment, reference being made to the following Figures.

Figure 1A:
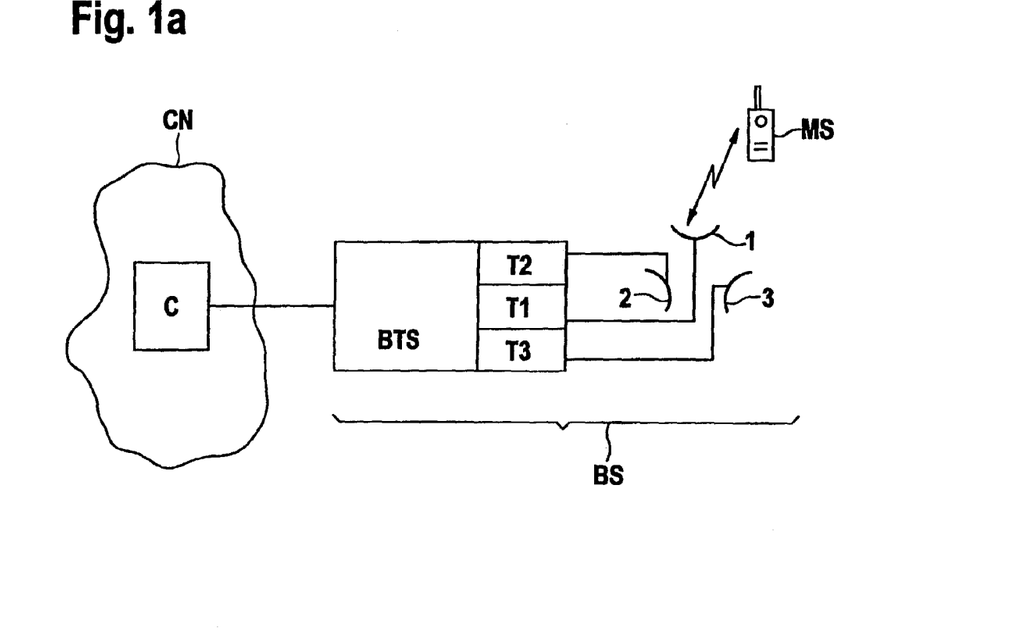
FIG. 1a illustrates the construction of a mobile communications network according to the invention.

FIG. 1a illustrates the schematic construction of a mobile communications network according to the invention with at least one radio base station location BS which is connected to the core network CN of the mobile communications network. Situated at the radio base station location BS is a radio base station BTS comprising three radio transmitters T1, T2 and T3 which supply different radio coverage areas (see S1 to S3 in FIG. 1b) of the radio base station location BS. The radio transmitters need not be situated in one single radio base station, but can also each be integrated in a different radio base station. This can be the case for example if different radio transmission methods are used in the radio coverage areas.

Each of the radio transmitters T1, T2 or T3 transmits radio signals via a transmitting antenna, here a sector antenna 1, 2 and 3, in its radio coverage area to mobile communications terminals, of which one, MS, has been shown in FIG. 1a by way of example. However, for the computational accuracy of the process it is advantageous for the transmitting antennae 1, 2 and 3 to be mounted as far as possible at the same location, e.g., on an antenna mast. The mobile communications terminal MS shown here is in direct radio contact with the transmitter T1 of the radio base station BTS. The radio base station is connected i.a., to a computer C arranged in the core network CN. In this example, the computer C is integrated in the mobile switching center and, in accordance with the process to be described in detail later, now determines the radio reception direction, by means of which for example the precise position of the mobile communications terminal MS can finally be calculated. The computer can also be installed at other locations, thus for example in the radio access network, in particular in the radio base station controller (base station controller) or in the radio network controller, or also at data nodes, such as for example the so-called gateway GPRS support node (GPRS: general packet radio service) or the serving GPRS support node for the UMTS.

Figure 1B:
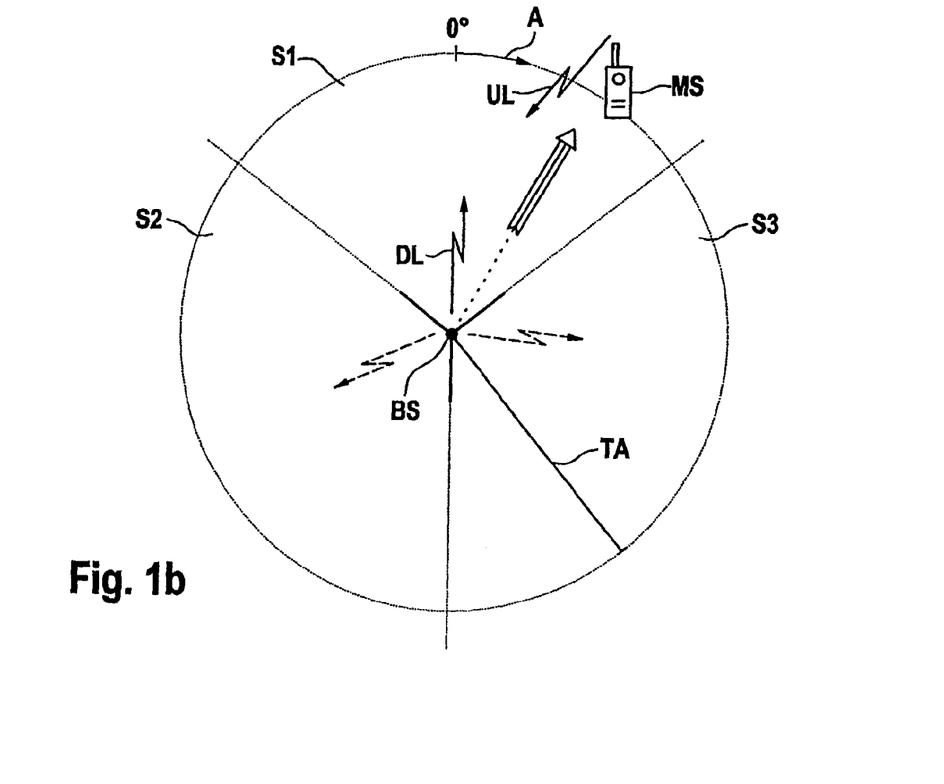
FIG. 1b shows the structure of a radio base station location.

FIG. 1b schematically illustrates a plan view of the construction of the radio base station location BS comprising three radio coverage areas in the form of three mutually adjacent sectors S1, S2 and S2. Each of the sectors S1, S2 or S3 is supplied by a transmitting antenna in the form of the sector antennae 1, 2 and 3 with an opening angle of 120□. The mobile communications terminal MS is situated directly in the radio coverage area S1 and is in radio contact with the radio base station (not shown here: see BTS in FIG. 1a) via the corresponding sector antenna. This means that this sector S1 corresponds to the so-called "serving cell" or also "active set". The radio signals are transmitted from the corresponding transmitting antenna (see 1 in FIG. 1a) on the downlink DL to the mobile communications terminal MS. In the reverse direction, i.e., on the uplink UL, the mobile communications terminal MS sends back its radio signals to the antenna.

The radio reception direction D on the downlink is now to be determined in order then to facilitate for example a position determination of the mobile communications terminal MS. This can take place for example on the one hand by determining the radio reception direction D and on the other hand by calculating the distance between the transmitting antenna and the mobile communications terminal MS, which can be derived from the radio signal propagation time TA and which itself is given in the form of a so-called timing advance or round trip time. The distance corresponds to a radius around the center point of the radio base station location BS. The radio reception direction D is itself indicated by an azimuthal angle A. On the basis of the radius and the angle, the position of the mobile communications terminal MS can then be accurately determined. The invention proposed here is particularly intended for determining the radio reception direction however.

As illustrated in FIG. 1b, the sector-shaped radio coverage areas S1 to S3 are aligned such that in its main radiation direction the radio coverage area S1 faces northwards, i.e., points to where the azimuthal angle A is 0°. The main directions of the other sectors S2 and S3, which are each offset by 120°, thus point to 120° and 240° respectively. The mobile communications terminal MS is now situated within the radio field coverage area (radio sector) S1. The radio reception direction D could now be determined by comparing the reception level measured by the radio communications terminal MS with the antenna diagram of the sector antenna used for the sector S1. However this would firstly result in the calculation of two symmetrically north-facing azimuthal angles with an equal opening angle, thereby precluding an unequivocal determination of the radio reception direction D. Furthermore, it would be necessary to know the radio field attenuation in order to be able to compare the measured reception level with the reference values of the antenna diagram. Additionally, the radio propagation conditions, in particular the radio field attenuation, are not stable but dependent upon occurring effects, such as for example radio screening, reflections or fading and weather changes with fluctuating air humidity and temperature. Simply the problems of radio screening and reflections alone, which occur particularly frequently in densely populated and urban areas, impede a reliable determination of the radio reception direction according to the conventional methods or render these totally impossible.

Figure 2A:
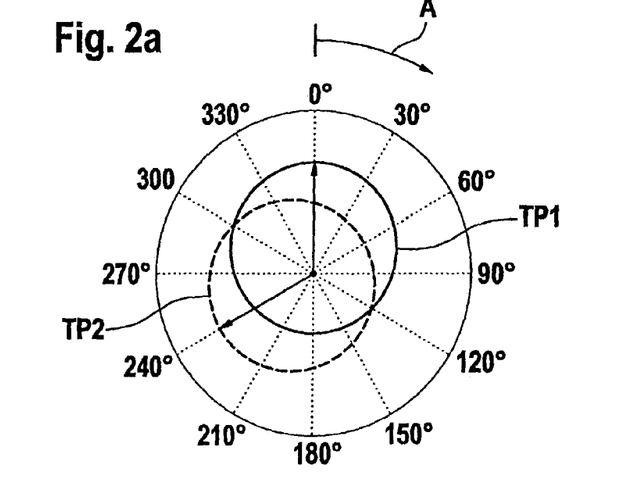
FIGS. 2a and 2b illustrate the transmission power level characteristic (antenna diagram or functions) of the radio coverage areas at the radio base station location.
Figure 2B:
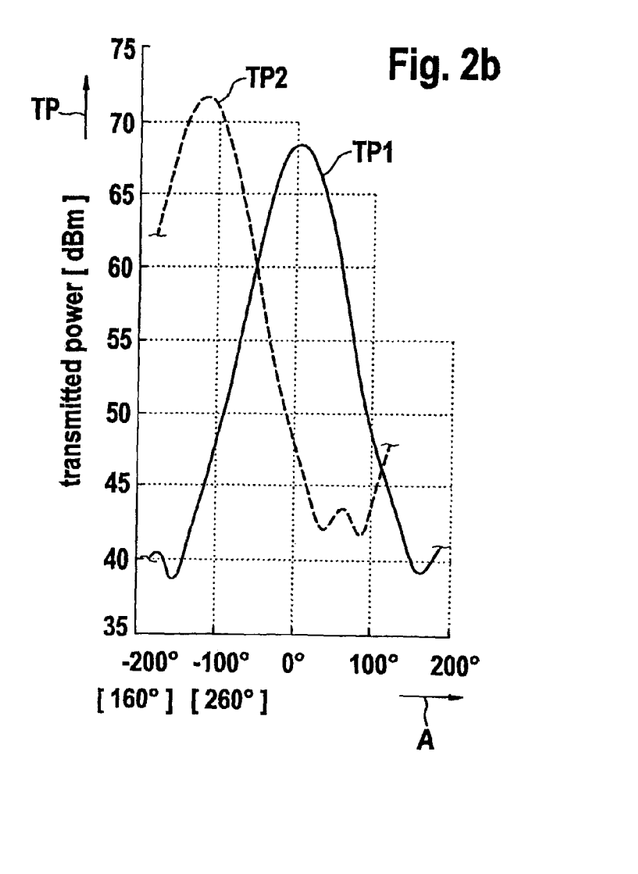
Figure 3:
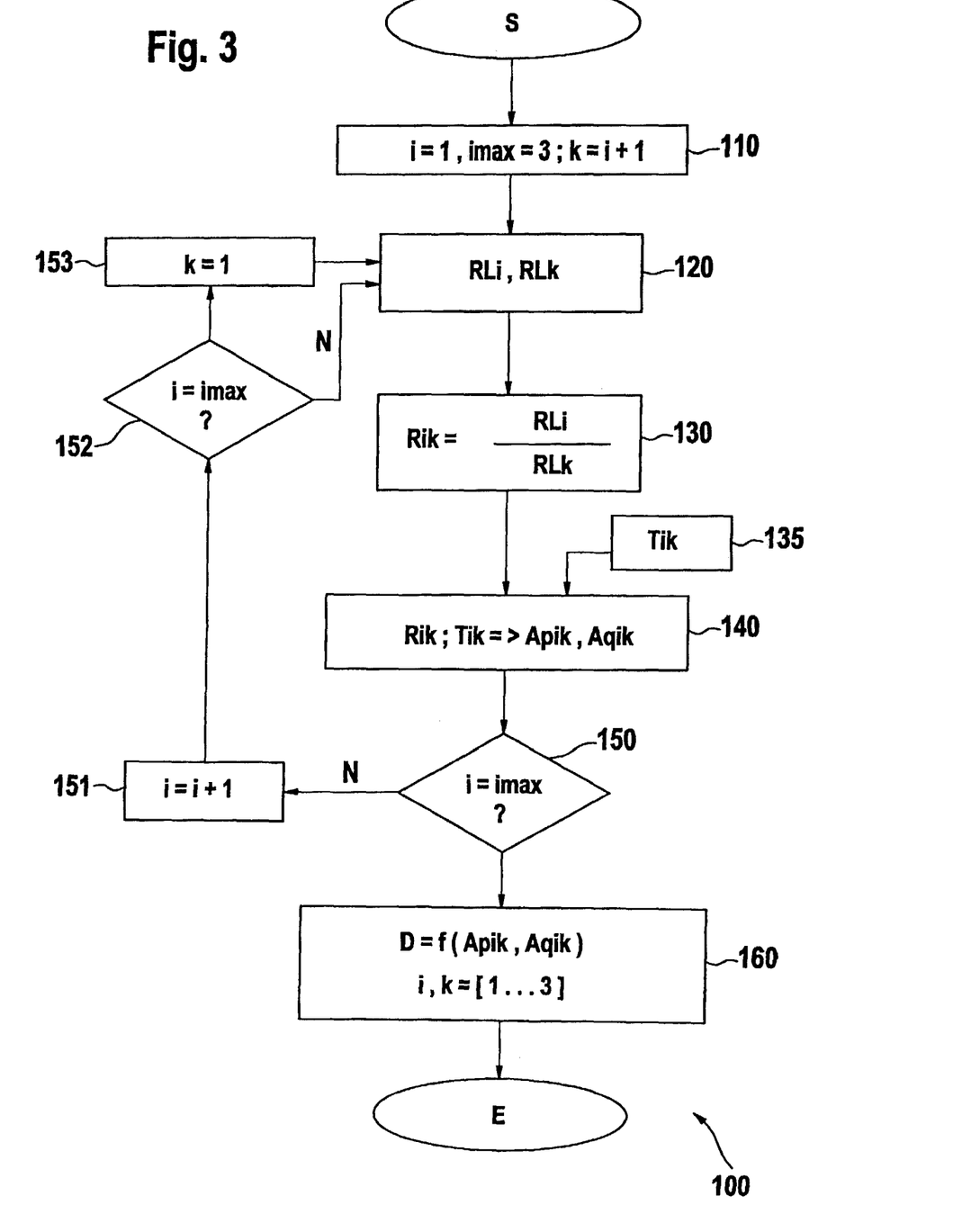
FIG. 3 is the flow diagram of a process according to the invention.

Therefore a new process is proposed here which will be described in further detail making reference i.a., to FIG. 2:

FIG. 3 is the flow diagram for a process 100 according to the invention comprising the steps 110 to 160, here in the form of an iterative process. After the start S of the process, in a first step 110 the following iteration parameters are set:

A first index i, which is also a loop counter, is set at its initial value 1. A maximum value imax, corresponding to the number of the radio field sections (sectors), is set at 3. And a second index k is set at i+1.

In the following step 120 firstly the reception levels in the various radio field sections are measured. Here a first reception level RLi and a second RLk are determined. For the first run this means that the reception value RL1 for the first sector and the reception value RL2 for the second sector (see S1 and S2 in FIG. 1b) are measured.

Then in a next step 130 these measured reception levels are related to one another to form a ratio value Rik. In this case this means that the ratio value R12 is formed from the ratio of RL1 to RL2. This calculated ratio value R12 is later used to determine the azimuthal angles. In an intermediate step 135, reference values Tik are retrieved from a look-up table. These reference values represent the characteristic of the reference curve shown in FIG. 4a. This first case thus relates to the reference values T12 which correspond to a curve corresponding to the ratio of the transmission power level TP1 to the transmission power level TP2. Thus the transmitting-end power level functions TP1 and TP2 for the sectors S1 and S2 (see FIGS. 1b and 2b) are related to one another to form a ratio and used as reference values T12.

Figure 4A:
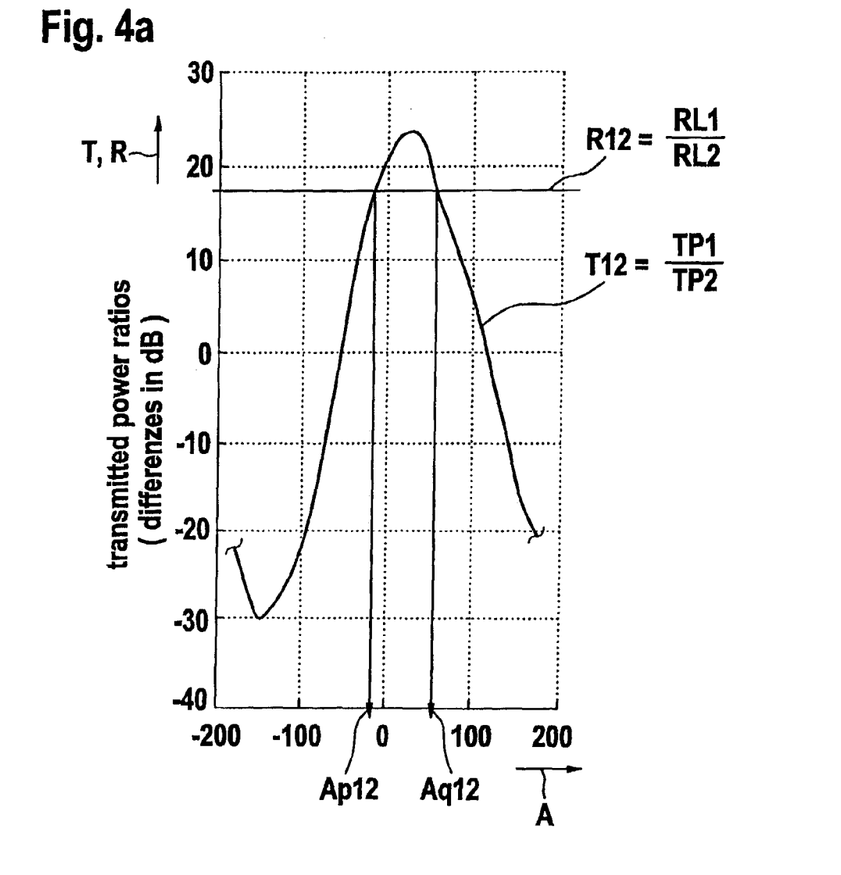
FIGS. 4a and 4b illustrated the expected ratio values for different azimuthal angles.

In a now following step 140, both the reference values Tik=T12 and the calculated ratio values Rik=R12 are compared with one another to calculate the desired azimuthal angles Apik=Ap12 and Aqik-=Aq12 therefrom (see also FIG. 4a). In this case this means that the ratio value R12 is compared with the reference value T12 and that where there is equality a corresponding azimuthal angle is determined.

Figure 4B:
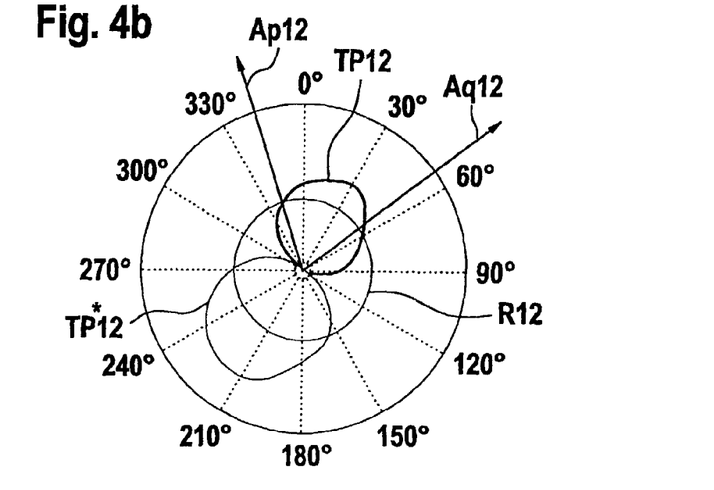

Thus in this case an azimuthal angle Ap12 corresponding to approximately 340° and an azimuthal angle Aq12 corresponding to approximately 57° are determined (see also FIGS. 4a and 4b). Only one of these two azimuthal angles actually points in the desired radio reception direction. The other is irrelevant and results from the ambiguous analysis procedure.

In order now to discover which azimuthal value is the correct one, a loop comprising the sub-steps 120 to 140 is run at least once more.

For this purpose it is firstly established whether the counter i has already reached the maximum value imax (step 150). In this example it is thus checked whether i=imax=3. If this is not the case, in a step 151 the counter i is increased by 1 and then in a step 152 it is checked whether the counter has now reached its maximum value imax. If this is not the case, the step 120, and subsequent steps 130, 135, 140 etc. follow directly. This means that in the second run (i=2) the reception values RL2 and RL3 for the corresponding sectors S2 and S3 are measured (step 120), that then the ratio value R23 is formed therefrom (step 130), and that finally further azimuthal angles Ap23 and Aq23 are estimated therefrom (step 140).

If however it is established in step 152 that the counter has already reached its maximum value (i=3), i.e., that here the loop has already been run twice, in a step 153 the second index is set at k=1. In this case this means that the reception level values RL3 and RL1 are now measured in the step 120. Thus the last possible pair relating to the sectors S3 and S1 is also formed, and the corresponding ratio value R31 determined. Finally the estimation of the azimuthal angles Ap31 and Aq31 also takes place in this connection. After the third run of the loop, with the aid of the decision stage 150 is then established that the counter has reached its maximum value (i=imax=3) and the step 160 follows.

In this step 160 all the previously calculated azimuthal angles are now compared with one another in order then to determine the desired radio reception direction D and thereafter to end the process in the step E.

Figure 5:
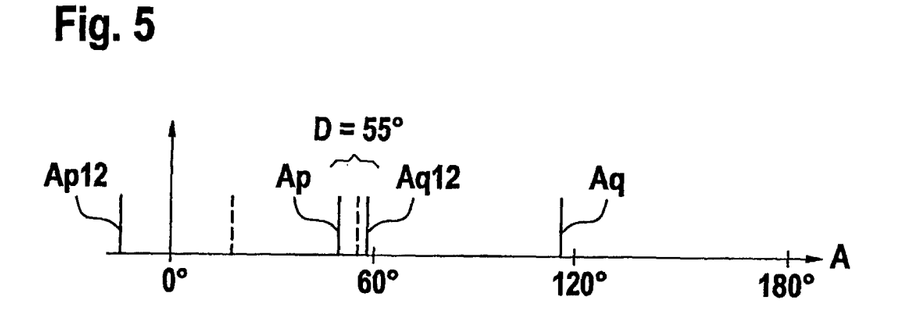
FIG. 5 illustrates the distribution of a plurality of azimuthal angles and the resultant reception direction and FIG. 6 illustrates a principle for precise position determination in a cellular radio network using the process according to the invention.

The procedure in step 160 will also be explained with reference to FIG. 5 in which the estimated azimuthal angles are plotted. In the Figure a cluster of estimated values can be noted in the range from 50 to 60°. By forming the mean value of the three estimated values occurring here, a radio reception direction D of 55° is finally obtained.

The values R23 and T23 relate exclusively to radio field sections (sectors) which do not directly supply the mobile communications terminal MS. Thus they are not serving cells or active sets, but so-called neighbor cells or candidate/monitoring sets. These sectors are used for monitoring purposes by the mobile communications terminal MS which does not transmit any uplink signals thereon. It is now also possible only to use monitoring values of this kind, i.e., reception levels measured on the downlink, to calculate the azimuthal angles and radio reception direction, particularly when a plurality of such radio field areas exist (e.g., 5 in the case of a sectorization of 60°). This has the advantage that the measured values are not impaired by influences resulting from a transmission power control, to be performed in the serving cell, on the relevant radio channels. This is because the radio signals to be considered by the mobile communications terminal in the neighbor cells are radio channels on which a constant (maximum) power is radiated.

The process according to the invention can be performed even in one single radio base station location, so that no radio contact with a plurality of radio base station locations is required. The estimation of the radio reception direction becomes increasingly more accurate, the more iterations can be performed. This in turn is also dependent upon the number of existing sectors. However it is also conceivable to form ratio values not between the reception values of different radio sectors, but for example between the reception level emanating from an omnidirectional antenna and the reception level emanating from a sector antenna. This means that it is possible to determine the radio direction even within one single radio sector, on the one hand by measuring the reception level on a radio channel emanating from an omnidirectional antenna (for example on the so-called broadcast control channel) and on the other hand by measuring the reception level of the corresponding sector antenna (for example on one of the traffic channels). Instead of sector antennae it is of course also conceivable to use group antennae. Independently of the type of antenna which are used, the advantage of the invention is achieved simply by virtue of the fact that it is not absolute reception levels but ratio values (thus relative reception levels) which are calculated and compared with corresponding reference values. One of the advantages of this is that the proposed calculation method is independent of radio propagation conditions.

Figure 6:
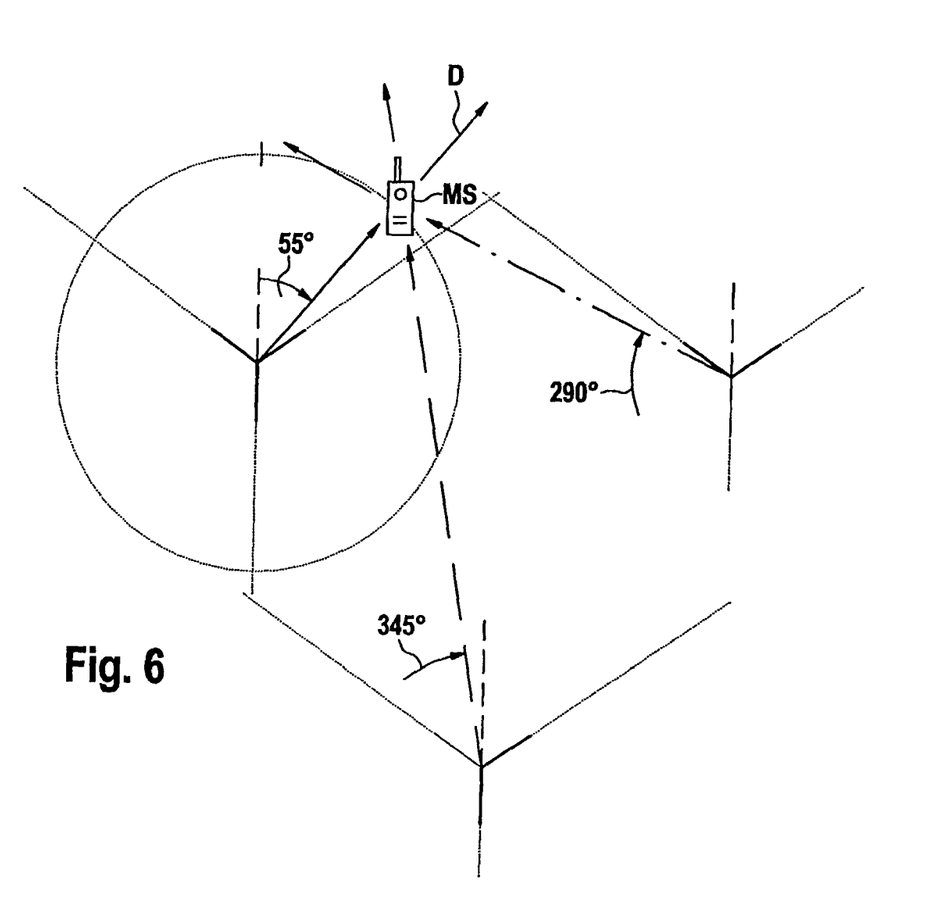

The proposed process can be used to determine the position of mobile devices. This will be briefly described for example making reference to FIG. 6 which is based on a cellular radio network in which each radio base station location comprises a plurality of sector antennae. If the determination of the relevant radio reception direction D now takes place at a plurality of radio base station locations, but at least at two adjacent locations, it is possible to take a cross bearing with which the position of the mobile communications terminal MS is finally calculated. In the example shown in FIG. 6, a reception direction D of 55° is determined at one radio base station location, a reception direction of 290° is determined at a second radio base station location, and a reception direction of 345° is determined at a third location. Superimposition of the different reception directions results in a triangle (ideally an intersection point) indicating the location area of the mobile communications terminal MS. Other processes are of course also conceivable in which the reception direction is determined only in one single radio cell or radio sector, and this is used in association with a distance determining procedure (signal propagation time measurement) for the position calculation. The proposed process can be arbitrarily combined with other locating- and position-finding processes.

The invention claimed is:

1. A mobile communications terminal for a mobile communications network comprising at least one radio base station location which covers at least two spatial radio coverage areas, wherein at the radio base station location there are arranged a plurality of radio base station transmitters which, in each case in one of the radio coverage areas, on the downlink radiate radio signals via a plurality of transmitting antennae for reception by mobile communications terminals, and wherein the radio base station is connected to a computer which, for the mobile communications terminal, determines the radio reception direction on the downlink, the mobile communications terminal measuring the reception levels of radio signals which are radiated at least from a first transmitting antenna and a second transmitting antenna of the transmitting antennae, and communicating the reception levels to the radio base station, wherein the radio base station transmits the reception levels to the computer, which forms a ratio value in each case from two of the measured reception levels, and estimates azimuthal angles for the radio reception direction to be determined based on the ratio value.

2. A radio base station for a radio base station location which covers at least two spatial radio coverage areas in a mobile communications network, the radio base station comprising a plurality of radio base station transmitters and a plurality of transmitting antennae, which, in each case in one of the radio coverage areas, on a downlink radiate radio signals for reception by at least one mobile communications terminal, wherein the radio base station is connected to a computer which, for each mobile communications terminal, determines the radio reception direction on the downlink, wherein the relevant mobile communications terminal measures the reception levels of those radio signals which are radiated at least from a first transmitting antenna and a second transmitting antenna of the transmitting antennae, and communicates these reception levels to the radio base station, and the radio base station transmits the reception levels to the computer which forms a ratio value in each case from two of the measured reception levels, and estimates azimuthal angles for the radio reception direction to be determined based on the ratio value.

3. A mobile communications network comprising:
at least one radio base station location which covers at least two spatial radio coverage areas, and includes a plurality of radio base station transmitters and a plurality of transmitting antennae which, in each case in one of the radio coverage areas, on a downlink radiate radio signals via a transmitting antenna for reception by at least one mobile communications terminal, and
a computer which is connected to the radio base station location and for each mobile communications terminal determines the radio reception direction on the downlink, wherein the mobile communications terminal measures the reception levels of the radio signals radiated by a first transmitting antenna and a second transmitting antenna of the transmitting antennae, and the computer forms a ratio value from the two measured reception levels and estimates azimuthal angles for the radio reception direction to be determined based on the ratio value.

4. A computer for a mobile communications network with at least one radio base station which covers at least two spatial radio coverage areas wherein, in each case in one of the radio coverage areas, on a downlink a plurality of transmitters of the radio base station radiate radio signals via a a plurality of transmitting antennae for reception by at least one mobile communications terminal, wherein the radio base station is connected to the computer which, for each mobile communications terminal, determines the radio reception direction on the downlink, wherein the mobile communications terminal measures the reception levels of the radio signals which are radiated by a first transmitting antenna and a second transmitting antenna of the transmitting antennae, the computer forms a ratio value from the two measured reception levels, and estimates azimuthal angles for the radio reception direction to be determined based on the ratio value.

5. A method for determining the radio reception direction on the downlink at a radio base station location in a mobile communications network, wherein at least two spatial radio coverage areas are covered by the radio base station location, wherein in each radio coverage area on the downlink radio signals are radiated by means of a separate transmitting antenna for reception by at least one mobile communications terminal, the method comprising:

measuring at least the reception levels of the radio signals radiated by a first transmitting antenna and a second transmitting antenna of the transmitting antennae by the mobile communications terminal; and estimating azimuthal angles for the radio reception direction to be determined based on a ratio value formed from the reception levels.

6. The method according to claim 5, wherein one of the transmitting antennae is an omnidirectional antenna by which the whole area of the radio base station location is supplied, that the other transmitting antennae are sector antennae or group antennae by which sector-shaped radio coverage areas are supplied, and that the mobile communications terminal measures the reception levels which emanate from radio signals radiated by the omnidirectional antenna and which emanate from radio signals radiated at least by that sector- or group antenna which supplies the radio coverage area in which the mobile communications terminal is located.

7. The method process according to claim 5, wherein the reception levels of the radio signals radiated by the other transmitting antennae are also measured by the mobile communications terminal, that a ratio value which is independent of the prevailing radio propagation conditions is in each case formed from two measured reception levels, that these further ratio values are used to effect the estimation of further azimuthal angles for the radio reception direction to be determined, and that the radio reception direction is determined by means of all the estimated azimuthal angles.

8. The method according to claim 5, wherein the transmitting antennae are sector antennae or group antennae, and that the radio coverage areas are radio sectors which are each supplied by one of the sector antennae or group antennae.

9. The method according to claim 5, wherein the azimuthal angles are estimated by comparing the formed ratio value with predetermined reference values indicating the expected ratio value for different azimuthal angles.

10. The method according to claim 9, wherein the two transmitting antennae, whose radio signals are measured in respect of the reception levels, supply two mutually adjacent radio coverage areas and that the mobile communications terminal is situated at least in one of these two radio coverage areas.

\* \* \* \* \*